United States Patent
Etschmaier et al.

(10) Patent No.: US 10,741,035 B2
(45) Date of Patent: Aug. 11, 2020

(54) INTEGRATED SMOKE DETECTION DEVICE

(71) Applicant: ams AG, Premstaetten (AT)

(72) Inventors: Harald Etschmaier, Graz (AT);
Nobuyoshi Hiramatsu, Toyama (JP);
Olesia Synooka, Graz (AT)

(73) Assignee: ams AG, Premstaetten (AT)

( * ) Notice: Subject to any disclaimer, the term of this patent is extended or adjusted under 35 U.S.C. 154(b) by 0 days.

(21) Appl. No.: 16/345,828

(22) PCT Filed: Oct. 19, 2017

(86) PCT No.: PCT/EP2017/076750
§ 371 (c)(1),
(2) Date: Apr. 29, 2019

(87) PCT Pub. No.: WO2018/082932
PCT Pub. Date: May 11, 2018

(65) Prior Publication Data
US 2020/0184790 A1   Jun. 11, 2020

(30) Foreign Application Priority Data

Nov. 2, 2016   (EP) .................................... 16196873

(51) Int. Cl.
*G08B 17/107*   (2006.01)
*G01N 21/21*   (2006.01)
(Continued)

(52) U.S. Cl.
CPC ........... *G08B 17/107* (2013.01); *G01N 21/21* (2013.01); *G01N 21/532* (2013.01); *G08B 17/113* (2013.01); *G01N 2021/4792* (2013.01)

(58) Field of Classification Search
CPC .... G08B 17/107; G08B 17/113; G01N 21/21; G01N 21/532
(Continued)

(56) References Cited

U.S. PATENT DOCUMENTS 5,451,931 A * 9/1995 Muller ................. G08B 17/107
250/573
5,502,434 A * 3/1996 Minowa ............... G08B 17/103
250/574
(Continued)

FOREIGN PATENT DOCUMENTS

| CH | 571750 A5 | 1/1976 |
|---|---|---|
| CN | 200963473 | 10/2007 |
| JP | H11-316283 | 11/1999 |

OTHER PUBLICATIONS

European Patent Office, International Search Report for PCT/EP2017/076750 dated Feb. 6, 2018.
(Continued)

*Primary Examiner* — Kerri L McNally
(74) *Attorney, Agent, or Firm* — Fish & Richardson P.C.

(57) ABSTRACT

The integrated smoke detection device comprises a carrier (1), a light source (2) arranged on or above the carrier, a light receiver (3) arranged on or above the carrier at a distance from the light source, and a polarizing member (7) arranged on or above the carrier, the light source emitting radiation (a, b) into the polarizing member. The polarizing member is configured to have a boundary surface (11) that linearly polarizes a reflected portion (d) of the radiation emitted by the light source, and an exit surface (12) that allows the reflected portion (d) to exit the polarizing member.

13 Claims, 2 Drawing Sheets

(51) Int. Cl.
  *G01N 21/53* (2006.01)
  *G08B 17/113* (2006.01)
  *G01N 21/47* (2006.01)
(58) Field of Classification Search
  USPC .......................................................... 340/630
  See application file for complete search history.

(56) References Cited

U.S. PATENT DOCUMENTS

| | | | |
|---|---|---|---|
| 6,218,950 B1* | 4/2001 | Politze | G06K 9/00 340/619 |
| 6,788,197 B1 | 9/2004 | Thuillard et al. | |
| 7,746,239 B2* | 6/2010 | Nagashima | G01N 21/21 250/216 |
| 2008/0297360 A1* | 12/2008 | Knox | G01S 17/04 340/628 |
| 2013/0334417 A1* | 12/2013 | Lewiner | G01N 15/0656 250/338.5 |
| 2015/0268151 A1* | 9/2015 | Modawar | G01N 15/1436 356/336 |

OTHER PUBLICATIONS

Di Stasio, S., "Experiments on depolarized optical scattering to sense in situ the onset of early agglomeration between nano-size soot particles", Article in Journal of Quantitative Spectroscopy and Radiative Transfer • Apr. 2002; https://www.researchgate.net/publication/223164549, 11 pages.

* cited by examiner

INTEGRATED SMOKE DETECTION DEVICE

BACKGROUND OF THE INVENTION

A smoke detector is a device that senses smoke, typically as an indicator of fire. Commercial security devices issue a signal to a fire alarm control panel as part of a fire alarm system, while household smoke detectors generally issue a local audible or visual alarm from the detector itself. Many smoke detectors apply light scattering for smoke detection. This has the advantages of fast response and low signal drift, as well as low cost and long useful life. The reliability of such a smoke detector may be impaired by the presence of aerosols like water vapor, cigarette smoke, dust or various fumes, which may cause false alarm.

A light detector that is used in a smoke detector may be mounted in a smoke chamber, which shields ambient light but allows smoke to enter and reach the light detector. A smoke chamber enlarges the device and may unduly delay the detection of smoke, if the passage of the smoke to the light detector is inhibited by parts of the smoke chamber or by the shape or arrangement of the inlet. If the smoke detector is exposed to the environment, dust or dew may adhere to the smoke chamber in the course of time and may cause false alarms.

U.S. Pat. No. 6,218,950 B1 discloses a fire detector measuring light signals at two different scattering angles. Two optical paths for the scattered light are arranged in such a way that one of the paths responds predominantly to light aerosols whereas the other path responds predominantly to dark aerosols. An alarm threshold is determined depending on the brightness of the aerosol. Fraudulent measurement values arising from water vapor or the like are stored in a memory for further reference to avoid false alarms.

U.S. Pat. No. 6,788,197 B1 discloses a fire alarm device having an electronic evaluator, an optical module, a temperature sensor and at least one combustion gas sensor. A light source, which can be an LED, emits non-polarized light. A polarizer with a rotatable polarization plane, which may comprise a liquid crystal, is arranged between the light source and an optical receiver. Thus scattering of the emitted light can be measured in two orthogonal polarization planes.

U.S. Pat. No. 7,746,239 B2 discloses a light scattering type smoke detector including a sensor body, a light-emitter for emitting light toward an open smoke-sensing space and outputting a signal according to the amount of scattered light received, and a fire judging unit. Two light sources with polarization filters emit at different angles with different polarization states, and forward and backwards scattered light is collected by a light receiving element.

CN 200963473 Y discloses a photoelectric smoke fire detecting device based on depolarization. A light beam emitted from a light source is injected to a smoke granule via a polarizer, taking the plane passed by the incident light beam as a scattering base plane. The upper and lower sides of a receiving plane, which is vertical to the scattering base plane, are provided with two identical photoelectric receivers, which are placed close to and symmetrical to the scattering base plane with and without a polarizer which has a polarization axis vertical to the scattering plane.

In the publication of Stefano di Stasio, "Experiments on depolarized optical scattering to sense in situ the onset of early agglomeration between nano-size soot particles", Journal of Quantitative Spectroscopy and Radiative Transfer vol. 73 (2002), pages 423-432, soot aerosol particles generated in hydrocarbon flames are investigated by laser light scattering techniques. The contribution of co- and cross-polarized scattered light for vertical and horizontal linear polarization states are measured at variable polar angles. The vertical depolarization ratio measured against the scattering angle was found to be very low and flat in the case of smaller chain-like aggregates, whereas in the case of larger branched-chain aggregates, it exhibits a maximum at about 90°. The measured ratio between the two depolarized contributions for each of the vertical and horizontal polarization states of the incident light is found to be suitable to establish the onset of the early aggregation mechanism between nano-size soot particles formed in a flame.

When a light ray passes a planar boundary between two isotropic dielectric media, from a first medium having a refractive index $n_1$ to a second medium having a different refractive index $n_2$, the incident ray is split into a reflected ray and a refracted ray. The incident, reflected and refracted rays propagate in the same plane, which is designated as plane of incidence.

The angle of incidence $\theta_1$ is enclosed by the incident ray and a straight line normal to the boundary, the straight line intersecting with the incident ray. The angle of refraction $\theta_2$ is enclosed by the refracted ray and a straight line normal to the boundary, the straight line intersecting with the refracted ray. The indices $n_1$ and $n_2$ and the angles $\theta_1$ and $\theta_2$ are connected by Snell's law: $n_1 \cdot \sin\theta_1 = n_2 \cdot \sin\theta_2$.

The refracted ray vanishes if $n_2 < n_1$ and $\theta_1$ is so large that the equation $n_1 \cdot \sin\theta_1 = n_2 \cdot \sin\theta_2$ cannot be satisfied. This condition is called total internal reflection. The limit occurs for $\theta_2 = 90°$, in which case the angle of incidence is the critical angle $\theta_1 = \arcsin(n_2/n_1)$.

A component of the polarization that is normal to the plane of incidence is conventionally designated as s-polarization, and a component of the polarization that is parallel to the plane of incidence is designated as p-polarization.

The reflectance is the fraction of the incident power that is reflected from the interface between the dielectric media. From the Fresnel equations for non-absorbing, non-magnetic materials, the value of the reflectance for p-polarization is $[(n_1 \cdot \cos\theta_2 - n_2 \cdot \cos\theta_1)/(n_1 \cdot \cos\theta_2 + n_2 \cdot \cos\theta_1)]^2$.

The value of the reflectance is zero if $n_1 \cdot \cos\theta_2 = n_2 \cdot \cos\theta_1$, which is equivalent to $n_1 \cdot \sin(90°-\theta_2) = n_2 \cdot \sin(90°-\theta_1)$. This condition is met if $\theta_1 + \theta_2 = 90°$, according to Snell's law, and occurs for a special angle of incidence $\theta_B$, which is named Brewster's angle after the Scottish physicist David Brewster.

The equation $n_1 \cdot \sin\theta_B = n_2 \cdot \sin\theta_2 = n_2 \cdot \sin(90°-\theta_B) = n_2 \cdot \cos\theta_B$, which is valid in the case $\theta_B + \theta_2 = 90°$, yields the relation $\theta_B = \arctan(n_2/n_1)$. For a boundary between a clear molding compound and ambient air, Brewster's angle may be typically $\theta_B = 33.85°$.

SUMMARY OF THE INVENTION

The integrated smoke detection device comprises a carrier, a light source arranged on or above the carrier, a light receiver arranged on or above the carrier at a distance from the light source, and a polarizing member arranged on or above the carrier, the light source emitting radiation into the polarizing member. The polarizing member is configured to have a boundary surface that linearly polarizes a reflected portion of the radiation emitted by the light source, and an exit surface that allows the reflected portion to exit the polarizing member.

The light source and the polarizing member are configured such that the radiation emitted by the light source is redirected by total internal reflection of an emitted ray into an internally reflected ray, and the internally reflected ray is directed to the boundary surface.

An embodiment of the integrated smoke detection device comprises a detection region contiguous with the polarizing member. The detection region and the polarizing member comprise indices of refraction, the index of refraction of the polarizing member being higher than the index of refraction of the detection region.

A further embodiment comprises sidewalls limiting the detection region, the sidewalls being formed by a dark molding compound.

In a further embodiment the polarizing member comprises a clear or semitransparent molding compound.

In a further embodiment the light source emits directly into the polarizing member.

In a further embodiment the light source is embedded in the polarizing member.

In a further embodiment the light source, the light receiver and the polarizing member are arranged on a planar top surface of the carrier, and the light source emits in a direction normal to the top surface, away from the carrier.

In a further embodiment the polarizing member has a shape of a triangular prism or a truncated triangular prism.

In a further embodiment the boundary surface is arranged to generate a refracted portion and a reflected portion of the radiation emitted by the light source, a ray of the refracted portion and a ray of the reflected portion enclosing an angle of 90°.

In a further embodiment the light source and the polarizing member are configured such that the radiation emitted by the light source is redirected by total internal reflection of an emitted ray into an internally reflected ray.

In a further embodiment the internally reflected ray is directed to the boundary surface.

A further embodiment comprises an upper layer of the light receiver, the upper layer including a polarization filter. The upper layer may also include a band-pass filter.

A further embodiment comprises a photodiode and a further photodiode integrated in the light receiver, the polarization filter being arranged such that radiation passing the polarization filter is only received by the photodiode.

A further embodiment comprises a shielding member arranged between the light source and the light receiver, the shielding member being formed by a dark molding compound.

The following is a more detailed description of examples and embodiments of the integrated smoke detection device in conjunction with the appended figures.

DETAILED DESCRIPTION

Figure 1:
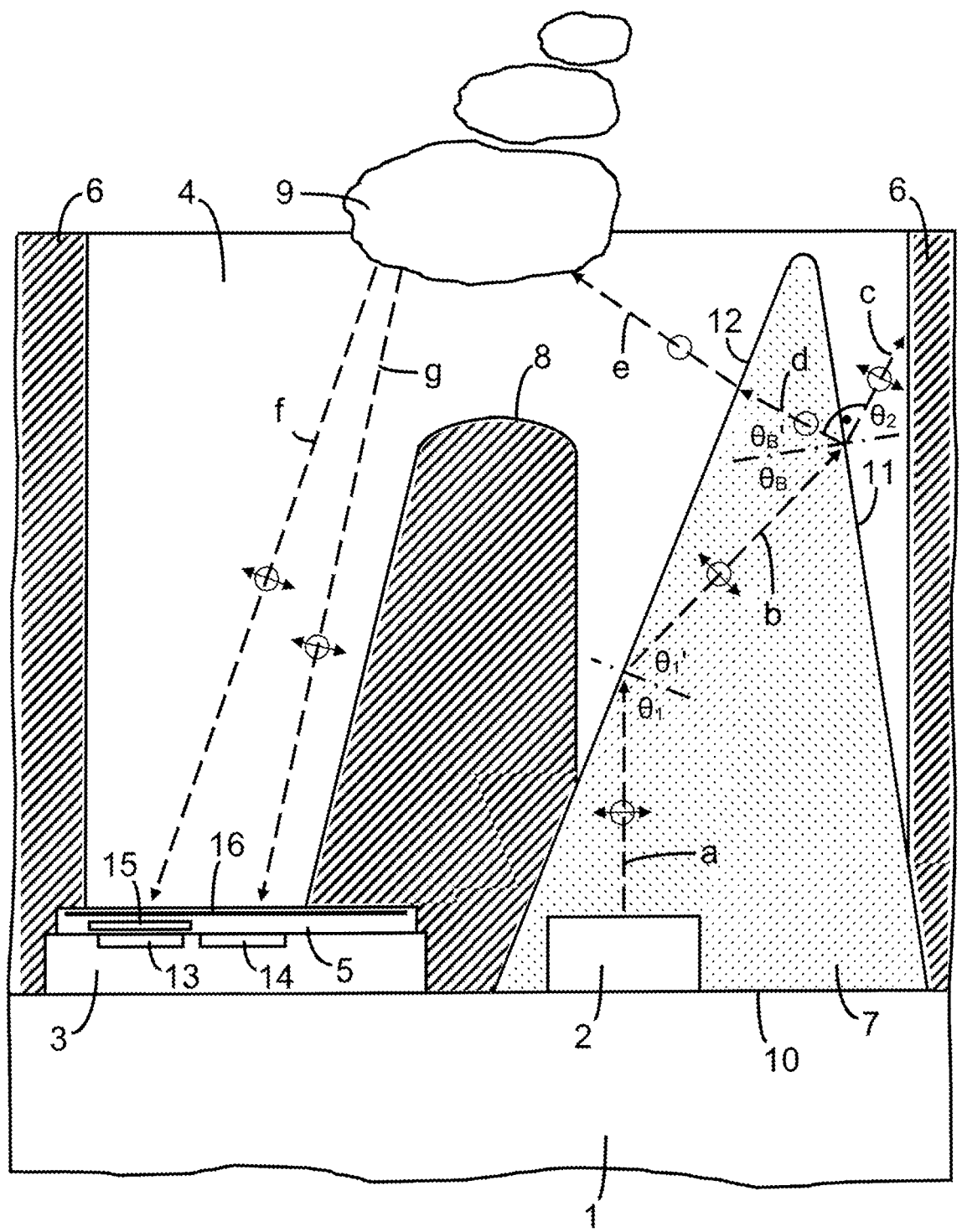
FIG. 1 is a cross section of an embodiment of the integrated smoke detection device.

FIG. 1 is a cross section of an embodiment of the integrated smoke detection device. A light source 2 is arranged on or above a top surface 10 of a carrier 1, which may in particular be a semiconductor substrate, like a silicon substrate, for instance. A light receiver 3 is arranged on or above the top surface 10 of the carrier 1 at a distance from the light source 2. The use of a semiconductor substrate as carrier 1 facilitates external electric connections of the light source 2 and the light receiver 3, in particular connections with electric circuits for power supply and/or signal processing.

The light source 2 may in particular be a light-emitting diode (LED) or a vertical-cavity surface-emitting laser (VCSEL), for instance. A vertical-cavity surface-emitting laser has the advantage that it provides a collimated and intense beam emitted in a relatively small solid angle.

The light receiver 3 may especially be a semiconductor device, like a silicon die with an integrated photodiode and/or readout circuitry, for instance. More than one photodiode may be integrated in the light receiver 3. The light receiver 3 may comprise an upper layer 5 including a polarization filter 15 and/or a band-pass filter 16.

FIG. 1 shows an embodiment comprising a photodiode 13 that is covered by the polarization filter 15 and a further photodiode 14 that is not covered by a polarization filter. This arrangement enables a differential measurement, which can compensate for obstructions of the light path by dirt or debris, for example.

The polarization filter 15 can especially be a metal grid formed in a metallization layer of a wiring provided for the circuitry. The optional band-pass filter 16 may be a narrow band-pass interference filter, for instance, which reduces the influence of ambient light.

A detection region 4 is present above the carrier 1. The detection region 4 may be limited by sidewalls 6, which may be formed by a dark molding compound absorbing radiation in the wavelength range of the light source 2, for instance. The detection region 4 is not closed and allows smoke 9 to enter from outside, especially from the environment. If no smoke is present, the detection region 4 may be filled with any gas from the environment that does not trigger the smoke detector, like ambient air, for instance. A smoke chamber may optionally be provided for the detection region 4 and may include the sidewalls 6, but a smoke chamber is not necessary for the integrated smoke detection device.

A polarizing member 7 is arranged adjacent to the detection region 4. The light source 2 can be contiguous with the polarizing member 7, so that the light source 2 emits radiation directly into the polarizing member 7. The polarizing member 7 is configured to have a boundary surface 11 that linearly polarizes a reflected portion d of the radiation a, b emitted by the light source 2, and an exit surface 12 that allows the reflected portion d to exit the polarizing member 7 and to enter the detection region 4. The polarizing member 7 may especially have essentially the shape of a triangular prism or a truncated triangular prism.

The polarizing member 7 may comprise a clear or semi-transparent molding compound like epoxy resin, for instance, and may especially be directly molded over the light source 2. Its index of refraction may be typically about 1.5, for example.

A shielding member 8 may optionally be arranged between the light source 2 and the light receiver 3 to shield the light emitted from the light source 2 and prevent stray light from reaching the light receiver 3. The shielding member 8 may be formed by a dark molding compound, for instance, especially the same kind of molding compound that is used for the sidewalls 6.

The embodiment according to FIG. 1 shows an example of a suitable path of the radiation emitted by the light source 2. The radiation is emitted into the polarizing member 7 in a direction pointing away from the carrier 1. If the top surface 10 of the carrier 1 is planar, the direction of an emitted ray a may especially be perpendicular to the top surface 10 of the carrier 1.

Total internal reflection within the polarizing member 7 may be employed to redirect the emitted ray a. To this end, the shape of the polarizing member 7 may be adapted so that the angle of incidence $\theta_1$ onto the first outer boundary surface of the polarizing member 7 that is reached by the emitted ray a is larger than the critical angle. Consequently, the emitted ray a is totally internally reflected into an internally reflected ray b as shown in FIG. 1. If the critical angle is assumed to be typically about 42° for a clear molding compound at an interface to ambient air, the angle of incidence $\theta_1$, which is equal to the angle of reflection $\theta_1'$, may be typically 67°, for instance.

The shape of the polarizing member 7 is such that the radiation propagating within, either the emitted ray a or the internally reflected ray b as in the embodiment shown in FIG. 1, reaches a boundary surface 11 of the polarizing member 7 at an angle of incidence $\theta_B$ that is smaller than the critical angle. Thus the boundary surface 11 splits the radiation into a refracted portion c and a reflected portion d. The reflected portion d is at least partially polarized.

The refracted portion c is not employed for the detection of smoke and may be absorbed at the sidewall 6.

The polarizing member 7 may especially be configured to yield Brewster's angle of incidence $\theta_B$ at the boundary surface 11, so that a ray of the refracted portion c and a ray of the reflected portion d form an angle of 90°, and the reflected portion d is linearly polarized. The right angle between the rays of the refracted portion c and the reflected portion d is indicated in FIG. 1 by an angle curve and a small dot.

Brewster's angle is about 34° at an interface between a dielectric material having a refractive index of about 1.5 and ambient air. The reflected portion d may be sufficiently polarized if the angle of incidence $\theta_B$ is not exactly but at least close to Brewster's angle.

The angle of incidence $\theta_B$ equals the angle of reflection $\theta_B'$. As the detection region 4, which may be filled with ambient air, for instance, has a refractive index that is lower than the refractive index of the polarizing member 7, the angle of refraction $\theta_2$ may be assumed to be larger than the angle of incidence $\theta_B$.

The polarized radiation exits the polarizing member 7 at an exit surface 12, from where it propagates into the detection region 4. If smoke 9 has entered the detection region 4 and the exiting ray e reaches the smoke 9, the radiation is scattered by the smoke 9, and scattered rays f, g propagating in different directions are observed.

In FIG. 1 polarization is indicated on the rays with double arrows and circles. The double arrows indicate the presence of a polarization parallel to the plane of the drawing, while the circle indicates the presence of a polarization normal to the plane of the drawing. If $\theta_B$ is Brewster's angle, the ray of the reflected portion d of the radiation is linearly polarized orthogonally to the plane of the drawing, as indicated by the presence of a circle and the absence of a double arrow. The exiting ray e maintains its linear polarization during its further propagation.

The polarization filter 15 is arranged to block the component of polarization that is orthogonal to the plane of the drawing of FIG. 1. Hence radiation that is totally linearly polarized in the orthogonal direction, which is indicated in FIG. 1 by the absence of a double arrow, cannot pass the polarization filter 15 and is thus prevented from reaching the photodiode 13 of the light receiver 3. If the radiation is scattered by smoke 9, the linear polarization is not maintained during scattering, so that the scattered rays f, g comprise components of polarization parallel and orthogonal to the plane of the drawing, as indicated in FIG. 1 by the presence of both circles and double arrows. The depolarized radiation traverses the polarization filter 15 on the light receiver 3, is detected by the photodiode 13, and a signal is triggered accordingly.

By way of example, FIG. 1 shows a scattered ray f that reaches the photodiode 13 through the polarization filter 15 and a further scattered ray g that reaches the photodiode 14 without traversing a polarization filter, thus enabling a differential measurement.

If there is no smoke in the detection region 4, but only water vapor, the polarized radiation will be scattered as well, but its linear polarization is not altered.

Consequently it will be blocked by the polarization filter 15 and cannot be detected by the photodiode 13. Triggering a false alarm in the absence of smoke is thus avoided.

Figure 2:
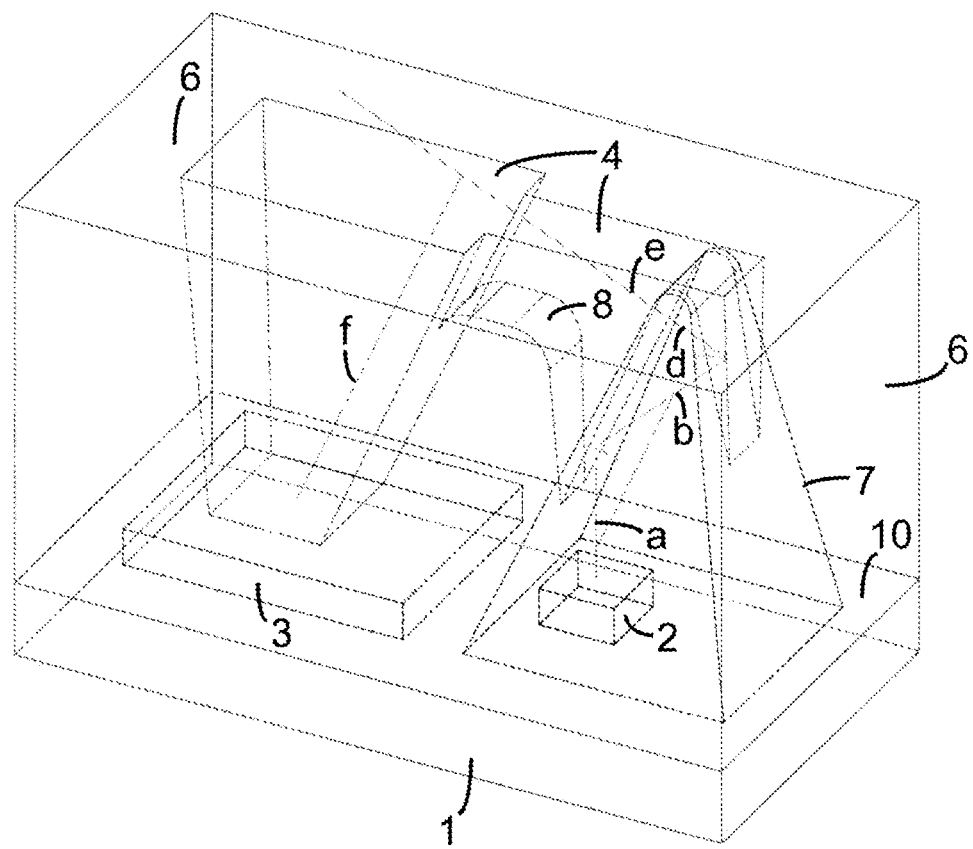
FIG. 2 is a transparent perspective view of the embodiment according to FIG. 1.

FIG. 2 is a transparent perspective view of the embodiment according to FIG. 1. Elements shown in FIG. 2 that correspond to elements shown in FIG. 1 are designated with the same reference numerals.

The detection mechanism of the integrated smoke detection device does not rely on an accurate alignment of the scattering angle. This enables a short optical path at a relatively large scattering volume and thus a reduction of size. Because of the compact arrangement of the smoke detection device, without smoke chamber, no complex optical elements that require a special manufacturing process are required. The device can easily be tested during the manufacturing process. Further advantages are high reliability, stability against cross-sensing of water droplets, and a reduction of the influence of stray light.

We claim:

1. An integrated smoke detection device, comprising:
   a carrier,
   a light source arranged on or above the carrier,
   a light receiver arranged on or above the carrier at a distance from the light source, and
   a polarizing member arranged on or above the carrier, the light source emitting radiation into the polarizing member;
   the polarizing member being configured to have a boundary surface that linearly polarizes a reflected portion of the radiation emitted by the light source, and an exit surface that allows the reflected portion to exit the polarizing member,
   the light source and the polarizing member being configured such that the radiation emitted by the light source is redirected by total internal reflection of an emitted ray into an internally reflected ray; and
   the internally reflected ray being directed to the boundary surface.

2. The integrated smoke detection device according to claim 1, further comprising:
   a detection region contiguous with the polarizing member, the detection region and the polarizing member comprising indices of refraction, the index of refraction of the polarizing member being higher than the index of refraction of the detection region.

3. The integrated smoke detection device according to claim 2, further comprising:
   sidewalls limiting the detection region, the sidewalls being formed by a dark molding compound.

4. The integrated smoke detection device according to claim 1, wherein the polarizing member comprises a clear or semitransparent molding compound.

5. The integrated smoke detection device according to claim 1, wherein the light source emits directly into the polarizing member.

6. The integrated smoke detection device according to claim 1, wherein the light source is embedded in the polarizing member.

7. The integrated smoke detection device according to claim 1, further comprising:
   a planar top surface of the carrier, the light source, the light receiver and the polarizing member being arranged on the top surface, and
   the light source emitting in a direction normal to the top surface, away from the carrier.

8. The integrated smoke detection device according to claim 1, wherein the polarizing member has a shape of a triangular prism or a truncated triangular prism.

9. The integrated smoke detection device according to claim 1, wherein the boundary surface is arranged to generate a refracted portion and a reflected portion of the radiation emitted by the light source, a ray of the refracted portion and a ray of the reflected portion enclosing an angle of 90°.

10. The integrated smoke detection device according to claim 1, further comprising:
    an upper layer of the light receiver, the upper layer including a polarization filter.

11. The integrated smoke detection device according to claim 10, further comprising:
    a band-pass filter in the upper layer.

12. The integrated smoke detection device according to claim 10, further comprising:
    a photodiode and a further photodiode being integrated in the light receiver, the polarization filter being arranged such that radiation passing the polarization filter is only received by the photodiode.

13. The integrated smoke detection device according to claim 1, further comprising:
    a shielding member arranged between the light source and the light receiver, the shielding member being formed by a dark molding compound.

* * * * *